(12) United States Patent
Mason et al.

(10) Patent No.: US 10,882,395 B2
(45) Date of Patent: Jan. 5, 2021

(54) FUEL MODULE PUMP HOLDER HAVING FUEL RETAINING RESERVOIR

(71) Applicants: Robert Bosch LLC, Broadview, IL (US); Robert Bosch GmbH, Stuttgart (DE)

(72) Inventors: Paul Mason, Dearborn, MI (US); David P. Toutant, Harper Woods, MI (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 124 days.

(21) Appl. No.: 16/146,183

(22) Filed: Sep. 28, 2018

(65) Prior Publication Data

US 2020/0101840 A1    Apr. 2, 2020

(51) Int. Cl.
  *B60K 15/077* (2006.01)
  *B60K 15/067* (2006.01)
  *B60K 15/073* (2006.01)
  *B60K 15/03* (2006.01)

(52) U.S. Cl.
  CPC .......... *B60K 15/077* (2013.01); *B60K 15/067* (2013.01); *B60K 15/073* (2013.01); *B60K 2015/03243* (2013.01); *B60Y 2200/12* (2013.01); *B60Y 2306/13* (2013.01)

(58) Field of Classification Search
  CPC .. B60K 15/077; B60K 15/067; B60K 15/073; B60K 2015/03243; B60Y 2200/12; B60Y 2306/13
  USPC ...................................... 123/198 C
  See application file for complete search history.

(56) References Cited

U.S. PATENT DOCUMENTS

| | | | |
|---|---|---|---|
| 2016/0016463 A1* | 1/2016 | Kimura ................. | B60K 15/03 137/565.01 |
| 2017/0241386 A1* | 8/2017 | Mason .................. | F02M 37/46 |
| 2019/0107089 A1* | 4/2019 | Bykowski ............ | F02M 37/103 |

* cited by examiner

*Primary Examiner* — Joseph J Dallo
*Assistant Examiner* — Yi-Kai Wang
(74) *Attorney, Agent, or Firm* — Kelly McGlashen; Maginot, Moore & Beck LLP (57) ABSTRACT

A fuel tank assembly includes a fuel tank and a fuel pump module. The module supports a fuel pump that delivers fuel to an engine of a vehicle, and includes a module housing that provides a cavity that receives the fuel pump, a reservoir that is actively filled with excess fuel discharged from a fuel pressure regulator, and a fuel return passageway that directs excess fuel discharged from the pressure regulator to the reservoir. When the fuel tank assembly is inverted, as may occur when the vehicle is operating under certain dynamic conditions, the discharged fuel is retained within the reservoir, and is supplied to the fuel pump inlet via a wicking filter that extends between the reservoir and the fuel pump inlet. As a result, engine stall due to lack of fuel during certain dynamic conditions can be delayed or avoided.

23 Claims, 6 Drawing Sheets

FUEL MODULE PUMP HOLDER HAVING FUEL RETAINING RESERVOIR

BACKGROUND

Fuel tank assemblies for saddle-type vehicles such as motorcycles, jet-skis and all-terrain vehicles may include a fuel tank, and a fuel pump and regulator assembly that is mounted within the fuel tank via a flange. In these systems, a fuel line extends between the pump and the fuel tank bottom, allowing fuel to be drawn into the fuel pump even when the fuel level of the tank is low. In use, saddle-type vehicles may be operated using dynamic maneuvers in which the vehicle aggressively accelerates, decelerates and moves through a large range of orientations due to operation over challenging terrains. For example, a motorcycle may experience large "cornering angles", a dynamic maneuver that corresponds to an extreme lateral lean of the motorcycle when traveling at high speeds around a curved path. In addition, a motorcycle may be operated with only a single wheel in contact with the ground during dynamic maneuvers such as "wheelies" where the front wheel is lifted off the around, or "stoppies" where the rear wheel is lifted off the around. During such dynamic maneuvers, due to the extreme or abnormal operating orientation of the vehicle, the fuel within the fuel tank may migrate away from the fuel line inlet, allowing the fuel pump to run dry and allowing the engine to stall.

Although some conventional four-wheeled vehicles such as passenger cars may position the fuel pump within a reservoir in the fuel tank to address fuel supply issues during dynamic operating conditions such as acceleration and deceleration, the limited available space in saddle-type vehicles makes it impractical to use conventional fuel tank reservoirs. Moreover, such reservoirs are often containers that open upward, whereby fuel freely drains from the reservoir under force of gravity when the orientation of the vehicle is extreme or inverted, rendering them ineffective.

Thus, it is desirable to provide a fuel tank assembly for saddle-type vehicles having a construction that supplies fuel to the fuel pump despite migration of fuel within the fuel tank away from the fuel pump inlet such as may occur when a vehicle experiences certain dynamic conditions.

SUMMARY

In some aspects, a fuel tank assembly for a vehicle includes a fuel tank, and a fuel pump module disposed in the fuel tank. The fuel pump module is configured to support a fuel pump within the fuel tank. The fuel pump module includes a module housing and the fuel pump. The module housing includes a pump holder. The pump holder includes a pump holder first end; a pump holder second end that is opposed to the pump holder first end; an inner wall that extends between the pump holder first end and the pump holder second end, an inner surface of the inner wall defining a pump cavity; an outer wall that surrounds a portion of the inner wall; and a reservoir that is disposed between a first portion of the outer wall and the inner wall. The reservoir includes a closed end that is disposed between the pump holder first end and the pump holder second end, and an open end that is disposed between the closed end and the pump holder first end. The fuel pump includes a pump first end that includes a fuel inlet; a pump second end that includes a fuel outlet and is opposed to the pump first end; and a longitudinal axis that extends through the pump first end and the pump second end. The fuel pump is disposed in the pump cavity with the pump first end received in the pump holder first end and the pump second end received in the pump holder second end.

In some embodiments, the pump holder comprises a fuel return passageway that provides a fuel return path between the pump holder second end and the pump holder first end, and the fuel return passageway is disposed between a second portion of the outer wall and the inner wall. In addition, the fuel return passageway is configured to return excess fuel provided at the fuel outlet to the fuel inlet.

In some embodiments, the outer wall is spaced apart from the inner wall in a direction transverse to the longitudinal axis, and the closed end of the reservoir extends between the outer wall portion and the inner wall. The reservoir includes a port that is in fluid communication with the fuel return passageway, and the port is disposed in the closed end.

In some embodiments, the outer wall is spaced apart from the inner wall in a direction transverse to the longitudinal axis, and the first portion of the outer wall extends circumferentially about the inner wall a distance corresponding to an arc of at least 120 degrees.

In some embodiments, the closed end extends between the outer wall portion and the inner wall, and the closed end intersects the inner wall along a line that extends about a circumference of the inner wall. In addition, the reservoir includes lateral sides that extend between the outer wall portion and the inner wall, and each of the lateral sides intersects the inner wall along a line that extends in parallel to the longitudinal axis.

In some embodiments, the closed end extends between the outer wall portion and the inner wall, and resides in a plane that is transverse to the longitudinal axis.

In some embodiments, the fuel pump module includes a filter disposed in the reservoir.

In some embodiments, the filter is a wicking filter.

In some embodiments, a protruding portion of the filter protrudes out of the reservoir and is angled toward the longitudinal axis of the fuel pump.

In some embodiments, the fuel pump module includes a wicking filter disposed in the reservoir. A portion of the filter protrudes out of the reservoir and overlies the fuel pump inlet, and fuel disposed in the reservoir is supplied to the fuel pump inlet via the wicking filter.

In some embodiments, the module housing includes a module locator that is disposed on the pump holder first end. The module locator includes a sleeve portion, and a footed portion that is disposed on one end of the sleeve portion and includes at least one protruding foot. A portion of the pump holder inner wall is disposed in the sleeve portion, a portion of the sleeve portion is disposed in the reservoir, and the footed portion protrudes out of the pump holder.

In some embodiments, the fuel pump module includes a filter disposed in the reservoir between the pump holder outer wall and the sleeve portion of the module locator.

In some embodiments, the vehicle is a saddle-type vehicle.

In some embodiments, when the fuel module is in a first operating orientation, fuel disposed in the reservoir flows out of the reservoir open end under force of gravity, and when the fuel pump is in second operating orientation, fuel disposed in the reservoir pools against the reservoir closed end.

In some embodiments, the fuel pump module includes a wicking filter disposed in the reservoir, and a portion of the filter protrudes out of the reservoir and overlies the fuel pump inlet. In addition, fuel disposed in the reservoir is supplied to the fuel pump inlet via the wicking filter.

In some aspects, a fuel pump module is configured to support a fuel pump within a fuel tank of a saddle-type vehicle. The fuel pump module includes a module housing configured to be disposed in the fuel tank of the saddle-type vehicle, the fuel pump disposed in the module housing, and a fuel pressure regulator supported by the module housing and disposed at an outlet of the fuel pump. The fuel pressure regulator is configured to control a fuel pressure of fuel discharged from the fuel pump and direct at least a portion of the fuel discharged from the fuel pump to an engine of the vehicle. The module housing is configured to direct excess fuel discharged from the fuel pump to a reservoir provided in the module housing. In addition, the reservoir is configured so that when the module housing is in a first orientation in space, the excess fuel drains from the reservoir under force of gravity, and when the module housing is in a second orientation in space that is different from the first orientation, the excess fuel is retained within the reservoir.

In some aspects, a fuel tank assembly includes a fuel tank and a fuel pump module. The module supports a fuel pump that delivers fuel to an engine of a vehicle and a fuel pressure regulator that controls the pressure of fuel discharged from the fuel pump. The module includes a module housing that provides a cavity that receives the fuel pump, a reservoir that forms a pocket that is actively filled with excess fuel discharged from the fuel pressure regulator, and a fuel return passageway that directs excess fuel discharged from the pressure regulator to the reservoir. As used herein, the term "excess fuel" refers to fuel that is discharged by the fuel pump but is not required by the vehicle engine at the time of discharge. When the fuel tank assembly is inverted, as may occur when the vehicle is operating under certain dynamic conditions, the discharged fuel is retained within the reservoir, and is supplied to the fuel pump inlet via a wicking filter that extends between the reservoir and the fuel pump inlet. As a result, engine stall due to lack of fuel during certain dynamic conditions can be delayed or avoided.

BRIEF DESCRIPTION OF THE FIGURES

FIG. 12 illustrates the fuel tank assembly in a normal operating orientation. In FIG. 12, pooled fuel in the fuel tank is represented by broken lines, and the path of excess fuel through the pump holder is represented by solid arrows.

FIG. 13 illustrates the fuel tank assembly in an extreme or abnormal operating orientation. In FIG. 13, pooled fuel in the pump holder is represented by broken lines, the path of excess fuel through the pump holder is represented by solid arrows, and the path of wicked fuel through the coarse strainer is represented by dotted arrows.

DETAILED DESCRIPTION

Figure 1:
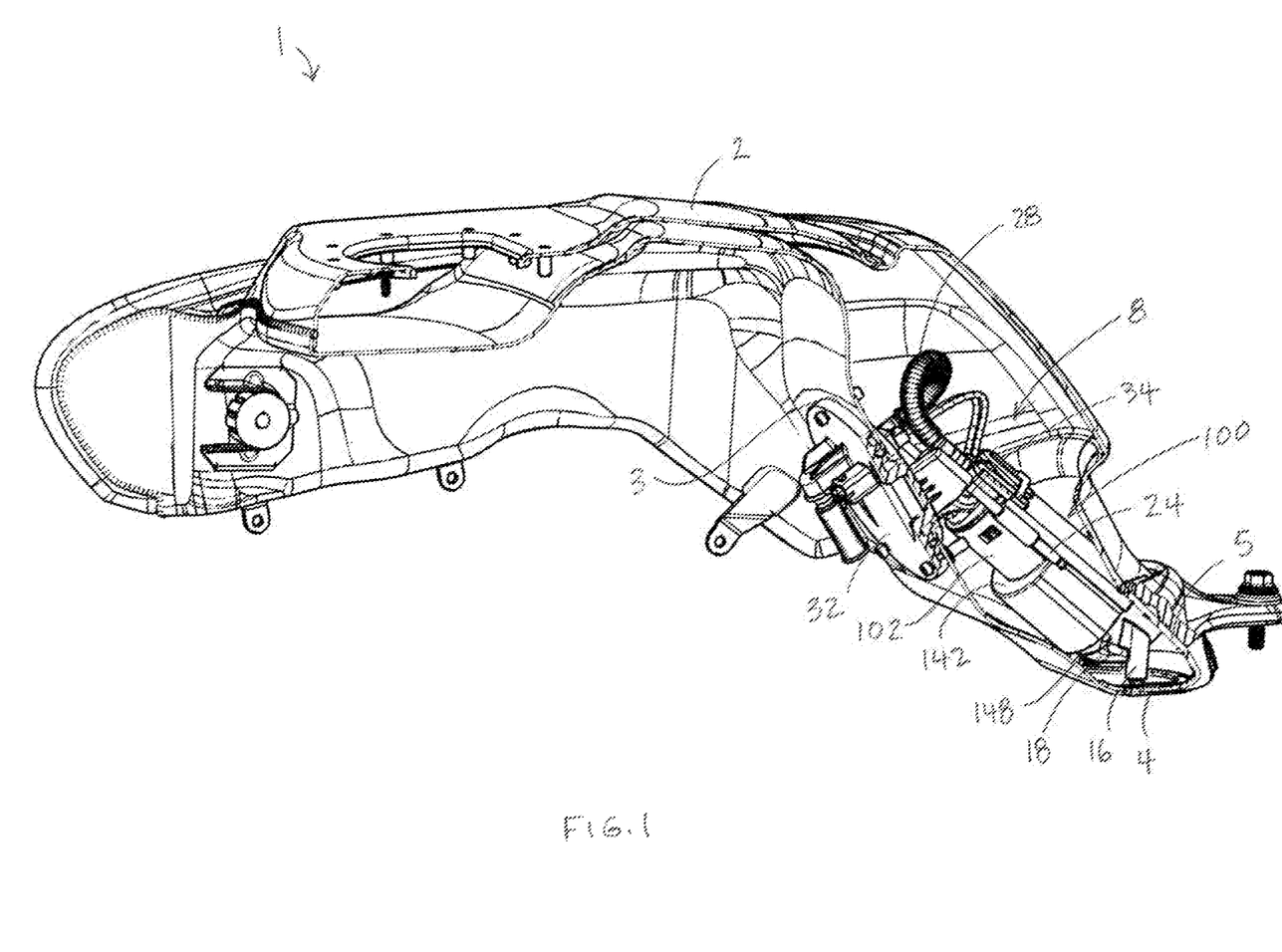
FIG. 1 illustrates a fuel tank assembly that includes a fuel module disposed within a fuel tank.
Figures 2, 3:
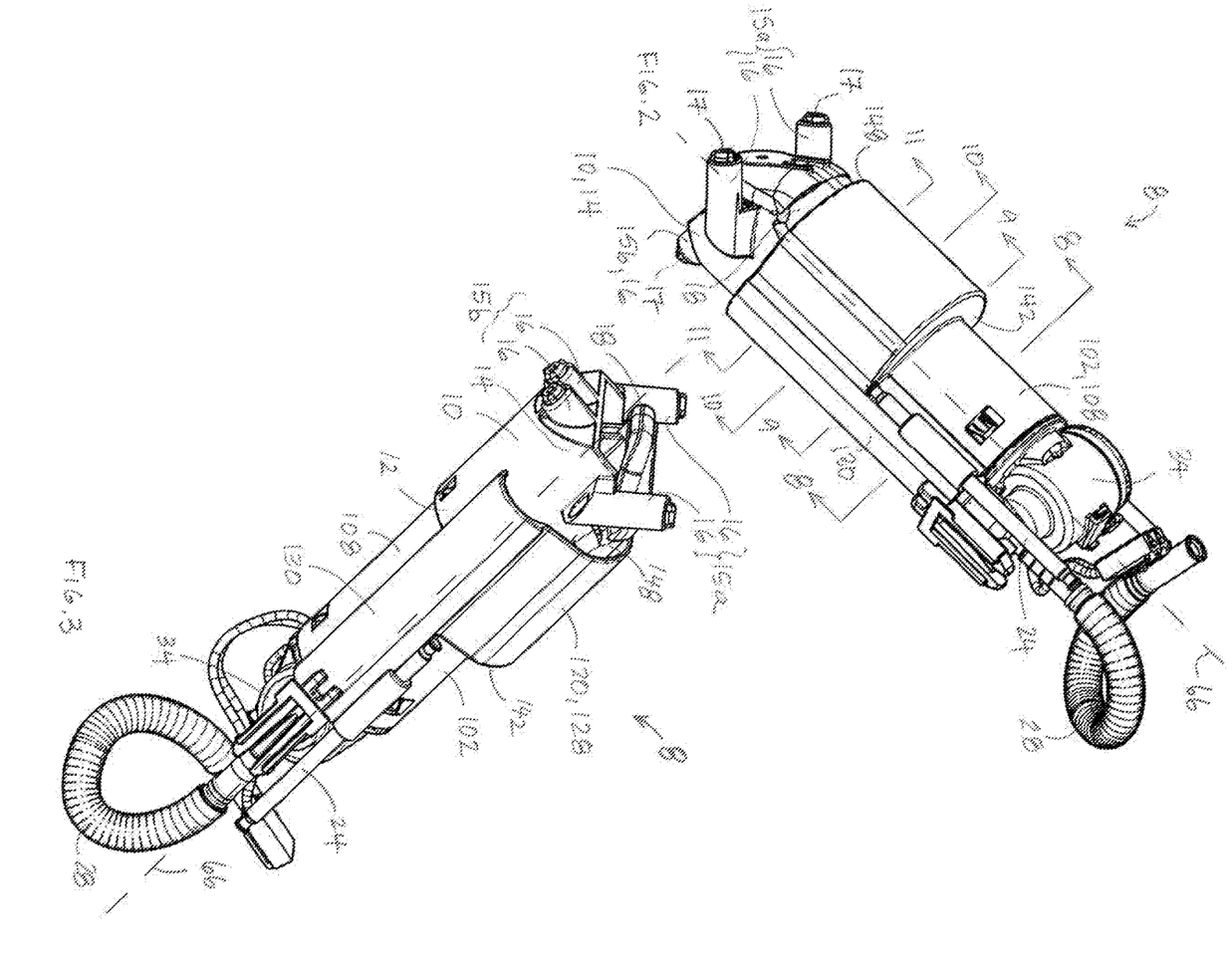
FIG. 2 is front perspective view of the fuel module with the flanged member omitted for clarity.
FIG. 3 is a rear perspective view of the fuel module with the flanged member omitted for clarity.
Figure 4:
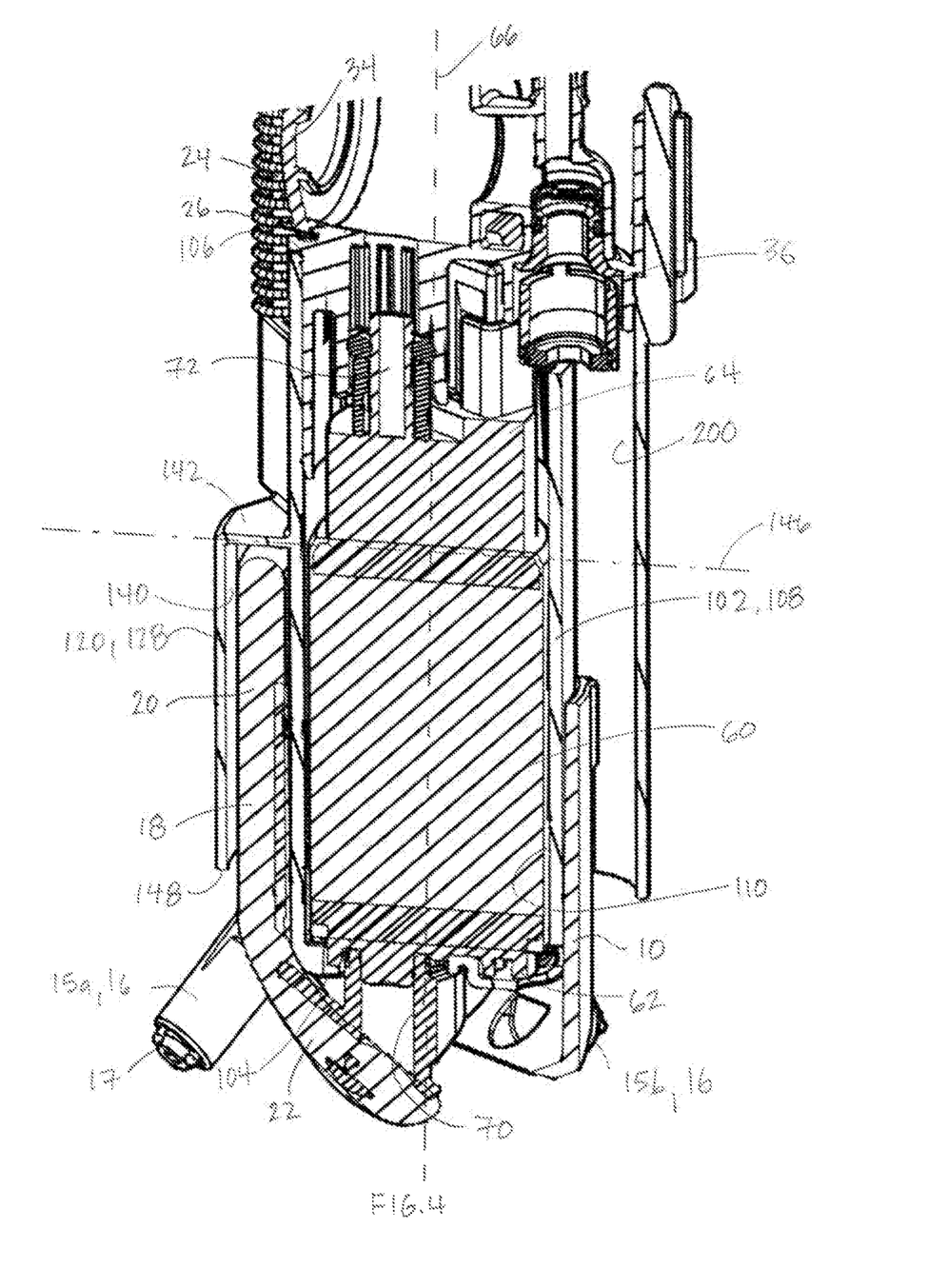
FIG. 4 is a cross-sectional view of the fuel module.
Figures 5, 6:
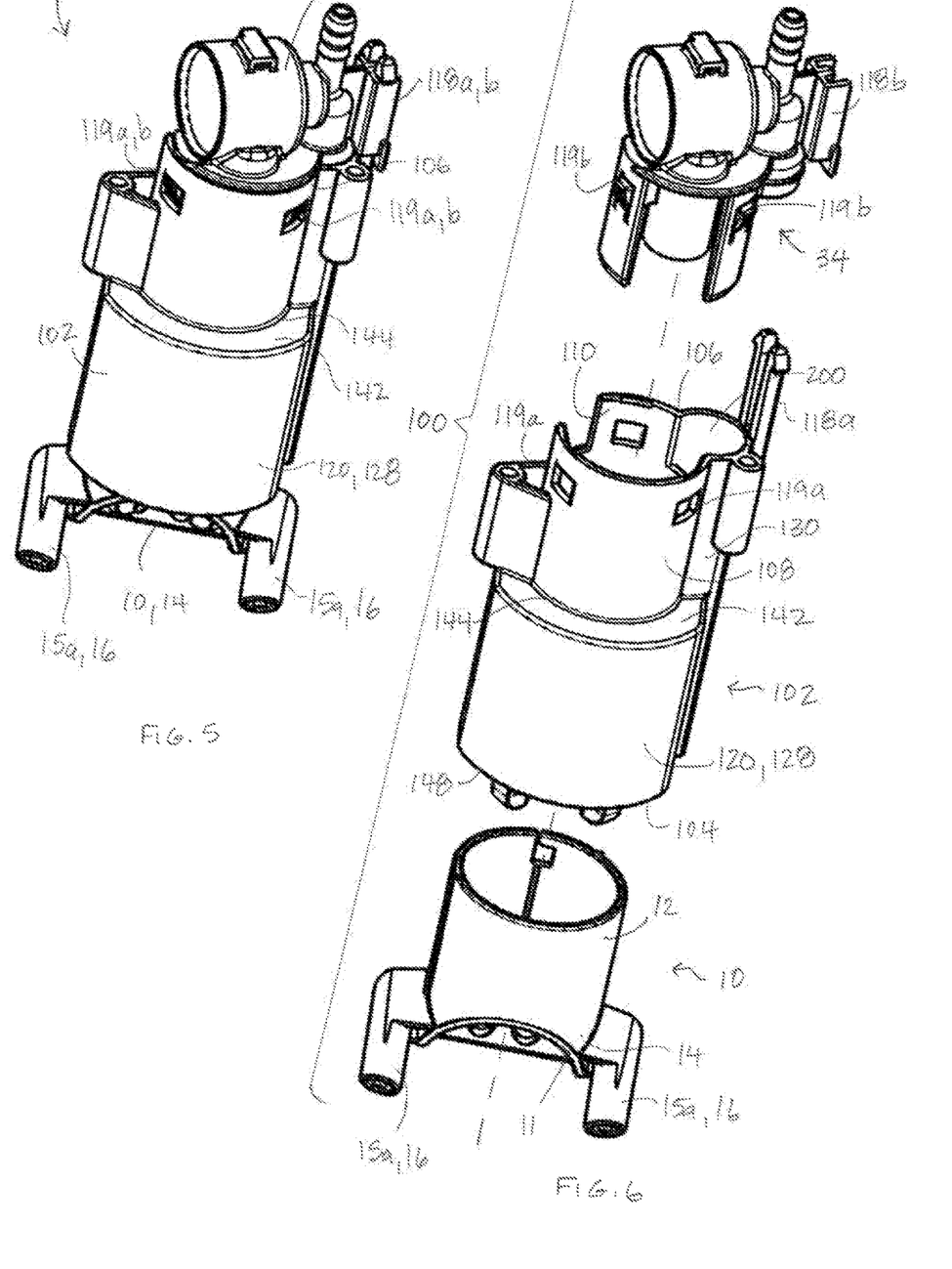
FIG. 5 is a perspective view of the pump holder of the module housing of the fuel module.
FIG. 6 is an exploded view of the pump holder of FIG. 5.
Figures 7, 8, 9:
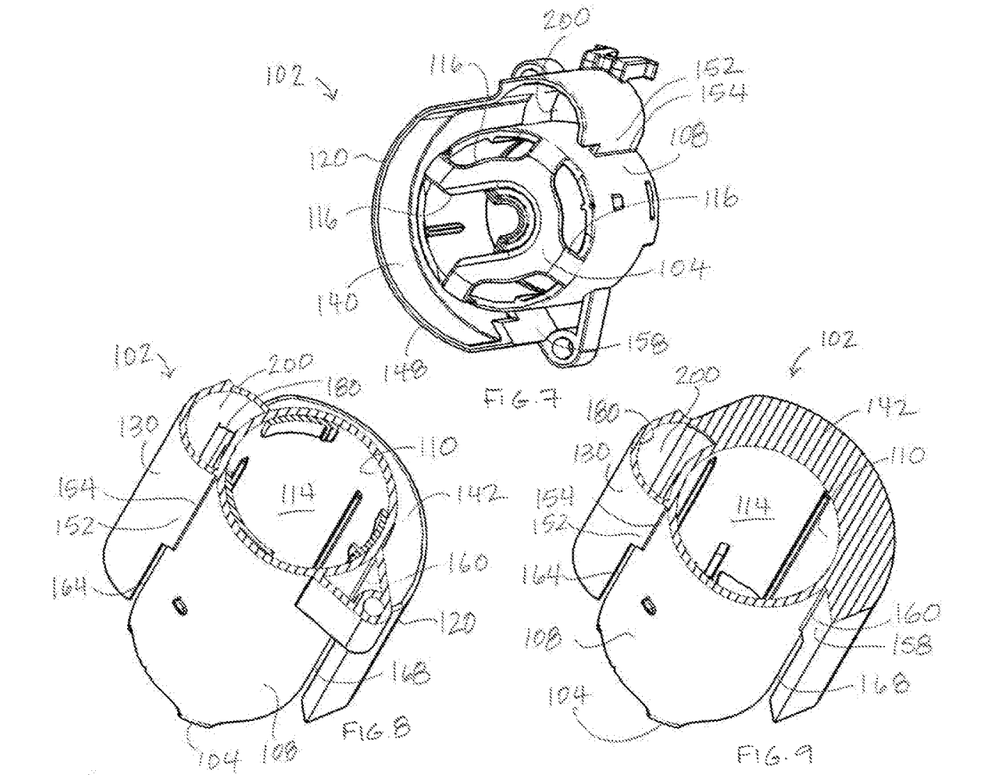
FIG. 7 is a perspective view of a lower end of the pump holder of FIG. 5.
FIG. 8 is a cross-sectional view of the pump holder as seen along line 8-8 of FIG. 2.
FIG. 9 is a cross-sectional view of the pump holder as seen along line 9-9 of FIG. 2.
Figure 10:
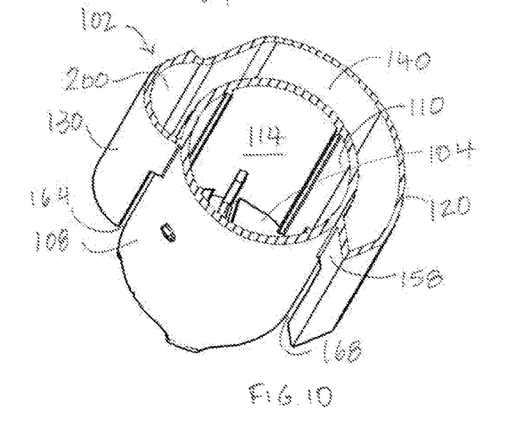
FIG. 10 is a cross-sectional view of the pump holder as seen along line 10-10 of FIG. 2.
Figure 11:
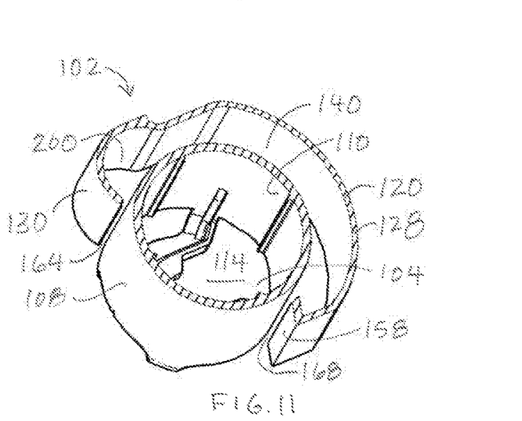
FIG. 11 is a cross-sectional view of the pump holder as seen along line 11-11 of FIG. 2.

Referring to FIG. 1, a vehicle fuel tank assembly 1 includes a fuel tank 2, and a fuel module 8 that is disposed within the fuel tank 2. The fuel tank 2 is mounted to a vehicle (not shown), which may be, but is not limited to, a saddle-type vehicle such as a motorcycle, a jet-ski or a four-wheeled all-terrain vehicle. The fuel tank 4 is an irregularly shaped container. The fuel module 8 is inserted into the fuel tank 2 through an opening 3 in an upper portion of the tank. As used herein, terms describing relative position such as "top", "bottom", "upper", "lower", "above" and "below" are used with reference to the fuel tank 2 as oriented for normal operation, as shown in FIG. 1.

Referring to FIGS. 2-6, the fuel module 8 includes a fuel pump 60, and a fuel pressure regulator 36 that regulates the fuel pressure of fuel discharged from the fuel pump 60. The fuel module 8 includes a coarse filter 18 that filters fuel before it enters the fuel pump 60, and a fine filter (not shown) that filters fuel as it exits the fuel pump 60. In addition, the fuel module 8 includes a module housing 100 that houses and support the fuel pump 60, the fuel pressure regulator 36 and the filters 18 within the fuel tank 2. The module housing 100 is located within the fuel tank 2 by a flanged member 32. The flanged member 32 is generally disk shaped, and overlies the fuel tank opening 3. The flanged member 32 seals the opening 3, and allows for electrical and hydraulic connections to be made with structures within the fuel tank 2, including the fuel pressure regulator 36 and the fuel pump 60. The module housing 100 is supported relative to the flanged member 32 via guide rods 24 that extend from the flanged member 32. A coil spring 26 surrounds one of the guide rods 24 and extends between the flanged member 32 and the module housing 100. The coil spring 26 is under compression, and biases the module housing 100 away from the flanged member 32 and against the bottom surface 4 of the fuel tank 2. The module housing 100 is an assembly of three housing elements, including a fuel pump holder 102 that supports the fuel pump 60, a module locator 10 that is disposed on a first end 104 of the fuel pump holder 102 and locates the module 8 relative to a bottom surface 4 of the fuel tank 2, and a filter housing 34 that is disposed on a second end 106 of the fuel pump holder 102 and supports the fine filter and fuel pressure regulator 36. The fuel pump holder 102 of the module housing 100 includes features that prevent fuel within the fuel tank 2 from migrating away from the fuel pump inlet 70 when the vehicle experiences certain dynamic conditions, as discussed further below.

In the illustrated embodiment, the fuel pump 60 is a turbine fuel pump with an electric motor. The fuel pump 60 is a generally cylindrical device that includes a pump first end 62, a pump second end 64 that is opposed to the pump first end 62, and a longitudinal axis 66 that extends between the pump first end 62 and the pump second end 64. When the fuel pump 60 is in a normal operating orientation such as shown in FIG. 1, the pump first end 62 is located at the bottom 4 of the fuel tank 2, and the pump second end 64 is at a higher position than the pump first end 62. The fuel pump 60 includes the fuel inlet 70 that is provided at the pump first end 62, and a fuel outlet 72 that is provided at the pump second end 64.

The fuel pressure regulator 36 receives high pressure fuel discharged from the fine filter, and regulates the pressure of the received fuel before directing it to the vehicle engine via a hose 28. Excess fuel (e.g., fuel not required by the engine) is returned to the fuel tank 2 via a fuel return passageway 200 provided in the fuel pump holder 102, as discussed further below.

Referring to FIGS. 5-11, the fuel pump holder 102 supports the fuel pump 60 within the fuel tank 2, and includes a pump holder first end 104 and a pump holder second end 106 that is opposed to the pump first end 104. The fuel pump holder 102 has an inner wall 108 that extends between the pump holder first and second ends 104, 106. An inner surface 110 of the inner wall 1-9 defines a pump cavity 114. The pump cavity 114 receives the fuel pump 60, and has a shape and dimensions that correspond to the shape and dimensions of the fuel pump 60. Thus, in the illustrated embodiment, the pump cavity 114 has a generally cylindrical shape. The fuel pump 60 is disposed in the cavity 114 with the first end 62 of the pump 60 disposed at the pump holder first end 104, and with the second end 64 of the pump 60 disposed at the pump holder second end 106.

The fuel pump holder first end 104 is closed and is integral with the inner wall 108. The pump holder first end 104 includes cut outs 116 that allow structures provided on the pump first end 62, including the fuel inlet 70, to be exposed to fuel disposed in the fuel tank 2. The cut outs 116 extend upward into the inner wall 108 at the pump holder first end 104, providing lateral access to the cavity 114 at the pump holder first end 104.

The fuel pump holder second end 106 is open, and the filter housing 34 is mechanically connected to the fuel pump holder second end 106 by, for example, snap fit fasteners 118a, 118b, 119a, 119b. By this configuration, fuel that is discharged from the fuel pump 60 passes through the fine filter that is housed in the filter housing 34, and is then directed to the fuel pressure regulator 36.

The fuel pump holder 102 has an outer wall 120 that surrounds a portion of the inner wall 108. The outer wall 120 includes a first outer wall portion 128 that partially surrounds a lower portion of the inner wall 108 and defines a reservoir 140, and a second outer wall portion 130 that overlies an upper portion of the inner wall 108 and defines a fuel return passageway 200.

The first outer wall portion 128 is spaced apart from the inner wall 108 in a direction transverse to the longitudinal axis 66, and extends circumferentially about the inner wall 108 a distance corresponding to an arc of at least 120 degrees. In the illustrated embodiment, the first outer wall portion 128 extends circumferentially a distance corresponding to an arc of about 180 degrees. The space between the first outer wall portion 128 and the inner wall 108 defines the reservoir 140. The reservoir 140 has a closed end 142 that is disposed approximately midway between the pump holder first end 104 and the pump holder second end 106, and an open end 148 that is spaced apart from the closed end 142. More specifically, the reservoir open end 148 is disposed between the reservoir closed end 142 and the pump holder first end 104. Although the reservoir open end 148 is disposed near to the pump holder first end 104, the reservoir open end 148 is not flush with the pump holder first end 104.

The closed end 142 of the reservoir 140 extends between the first outer wall portion 128 and the inner wall 108, and resides in a plane 146 (shown in FIG. 2) that is transverse to the longitudinal axis 66. In addition, the closed end 142 intersects, and is joined to, the inner wall 108 along a line 144 that extends about a circumference of the inner wall 108. The reservoir 140 includes lateral sides 152, 158 that extend between the first outer wall portion 128 and the inner wall 108. Each of the lateral sides 152, 158 intersects, and is joined to, the inner wall 108 along a line 154, 160 that extends in parallel to the longitudinal axis 66. The lines of intersection 154, 160 between the lateral sides 152, 158 and the inner wall 108 extend between the closed end 142 and a position between closed end 142 and the reservoir open end 148. That is, the lines of intersection 154, 160 extend only part way to the reservoir open end 148, and a narrow slot 164, 168 exists between each respective lateral side 152, 158 and the inner wall 108 at the reservoir open end 148. The slot 164, 168 receives a portion of the module locator 10, as discussed further below.

The second outer wall portion 130 is spaced apart from the inner wall 108 in a direction transverse to the longitudinal axis 66. The space between the second outer wall portion 130 and the inner wall 108 defines the fuel return passageway 200. The fuel return passageway 200 provides a fuel return path between the pump holder second end 106 and the pump holder first end 104. To this end, the second outer wall portion 130 has semicircular shape that is of smaller radius than the cavity 114. In addition, the second outer wall portion 130 extends along the inner wall 108 between the pump holder second end 106 and the reservoir closed end 142 in a direction parallel to the longitudinal axis 66. The fuel return passageway 200 intersects the reservoir closed end 142, and communicates with an interior space of the reservoir 140 via a port 180 formed in the reservoir closed end 142. By this configuration, the fuel return passageway 200 passageway is configured to return excess fuel provided at the fuel outlet 72 to the fuel inlet 70.

Referring again to FIG. 4, the coarse filter 18 is an elongate structure that includes an inner portion 20 that is disposed in the reservoir 140, and a protruding portion 22 that protrudes out of the reservoir open end 148. The inner portion 20 substantially fills the reservoir 140, while not extending into the fuel return passageway 200 or portions of the reservoir 140 that are longitudinally aligned with the fuel return passageway. The protruding portion 22 is angled relative to the inner portion 20 in such a way that the protruding portion 22 is angled toward the longitudinal axis of the fuel pump. As a result, the protruding portion 22 overlies the fuel pump inlet 70. The coarse filter 18 is a wicking filter that is configured to draw fuel throughout the area encompassed by the coarse filter.

The module locator 10 includes a short, cylindrical, open-ended sleeve portion 12 that receives the first end 104 of the fuel pump holder 102, The sleeve portion 12 has an inner diameter that is dimensioned to receive the fuel pump holder inner wall 108 therein in a tolerance fit manner. The sleeve portion 12 includes an angled cut-out 11 that overlies the fuel pump fuel inlet 70, allowing the fuel inlet unobstructed access to fuel disposed in the bottom of the fuel tank 2.

The module locator 10 also includes a footed portion 14 that is disposed on the lower end of the sleeve portion 12, and includes two pairs 15a, 15b of protruding feet 16. The feet 16 protrude outward from the footed portion 14 at an acute angle relative to the longitudinal axis 66. More specifically, a first pair of feet 15a protrudes outward from the footed portion 14 in a first direction relative to the longitudinal axis 66 so as to rest on a bottom surface 4 of the fuel tank 2, while a second pair of the feet 15b protrudes outward from the footed portion 14 in a second direction relative to the longitudinal axis 66 so as to rest on a side surface 5 of the fuel tank 2, whereby the module locator 10 stabilizes and locates the module 8 relative to an inner surface 4 of the fuel tank 2. Each foot 16 comprises a tube having a diameter that is much smaller than a diameter of the sleeve portion 12, and each tube terminates in a resilient pad 17.

In use, the module locator 10 is disposed on the first end 104 of the fuel pump holder 102 such that the lower portion of the pump holder inner wall 108 is disposed inside the sleeve portion 12, and the sleeve portion 12 is received in the slots 164, 168. As a result, a portion of the sleeve portion 12 extends into the reservoir 140 so as to reside between the inner portion 20 of the coarse filter 18 and the fuel pump holder inner wall 108. The footed portion 14 protrudes out of the fuel pump holder 102, and the protruding portion 22 of the coarse filter 18 is disposed between the feet 16 of the first pair of feet 15*a* so as to overlie the fuel pump inlet 70.

Figure 12:
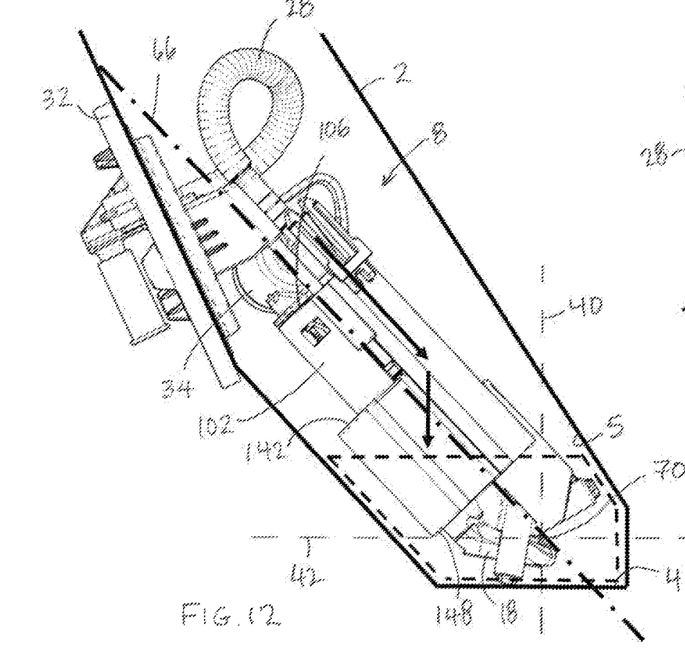

Referring to FIG. 12, the orientation of the fuel tank 2 and fuel module 8 in space illustrated in FIG. 12 corresponds to a "normal" operating orientation, such as occurs when the vehicle is operated on a horizontal surface with all wheels in contact with the horizontal surface. In this orientation, the pump second end 64 and the fuel pump holder second end 106 are above the pump first end 62 and the fuel inlet 70. In this orientation, the fuel pump holder first end 104 is supported on a bottom inside surface 4 of the fuel tank 2, and the longitudinal axis 66 is acutely angled relative to a vertical axis 40. In addition, the fuel pump holder 102 is oriented relative to the fuel pump 60 such that the reservoir 140 resides between a horizontal line 42 and the longitudinal axis 66, where the horizontal line 42 passes through the fuel pump inlet 70. As used herein, the term "horizontal" refers to a line that is perpendicular to the direction of gravity. When the fuel module 8 is in use in the normal operating orientation, fuel (represented by dashed lines in FIG. 12) pools at the bottom of the fuel tank 2, and is drawn through the coarse filter 18 into the fuel pump 60 via the fuel pump inlet 70. Pressurized fuel exits the fuel pump 60 via the fuel pump outlet 72 and passes through the fine filter housed in the filter housing 34. The filtered fuel is directed to the fuel regulator 36, which reduces the fuel pressure to a desired value and directs it to the vehicle engine (not shown) via the hose 28. Any excess fuel not required by the engine is returned by the regulator 36 to the fuel tank 2 via the fuel return passageway 200. Fuel passing through the fuel return passageway 200 (represented by solid arrows in FIG. 12) is directed to the reservoir 140, and exits the fuel pump holder 102 via the reservoir open end 148 under force of gravity, whereby it is returned to the fuel tank 2. Since the coarse filter 18 is supported at the bottom 4 of the fuel tank 2 by the module housing 100, fuel is delivered to the fuel pump 60 via the coarse filter 18, even when the fuel level in the fuel tank 2 is low.

Figure 13:
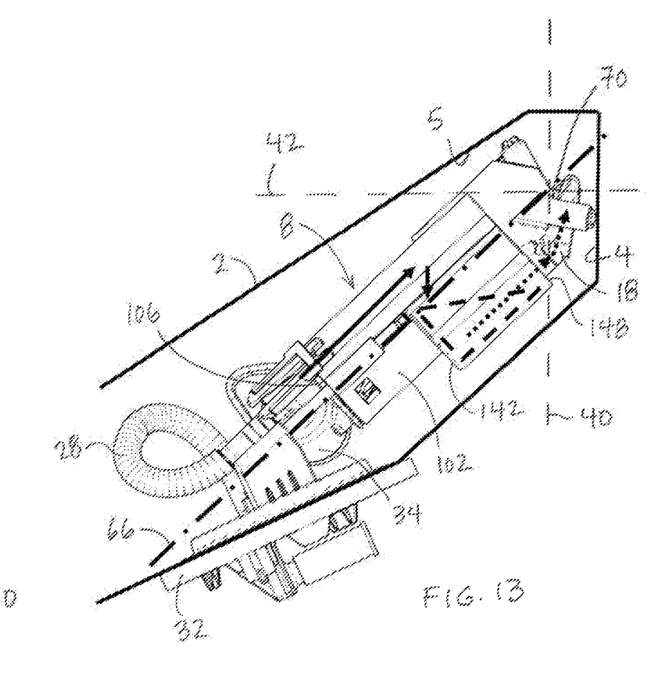

Referring to FIG. 13, the orientation of the fuel tank 2 and fuel module 8 in space illustrated in FIG. 13 corresponds to an extreme or "abnormal" operating orientation, such as occurs when the vehicle is operated on a steep slope or with only a single wheel (in the illustrated example, a front wheel) in contact with the horizontal surface. In this orientation, the pump first end 62 and fuel inlet 70 are above the pump second end 64 and the fuel pump holder second end 106. Although the fuel pump holder first end 104 is supported on the bottom inside surface 4 of the fuel tank 2, the bottom surface of the fuel tank 2 is above the second end 64 of the fuel pump 60. In this orientation, the fuel pump holder 102 is oriented relative to the fuel pump 60 such that the longitudinal axis 66 resides between the horizontal line 42 and the reservoir 140. In this orientation, fuel disposed in the fuel tank pools against the flanged member 32 and the fuel inlet 70 is not able to draw fuel from the fuel pooled against the flanged member 32. In addition, fuel disposed in the reservoir 140 pools against the reservoir closed end 142. Pooled fuel is represented by broken lines in FIG. 13.

When the fuel module 8 is in use in the abnormal operating orientation, excess fuel not required by the engine is returned by the regulator 36 to the fuel tank 2 via the fuel return passageway 200. Fuel passing through the fuel return passageway 200 (represented by solid arrows in FIG. 12) is directed to the reservoir 140, where it pools against the reservoir closed end 142. During operation in the abnormal operating orientation, the fuel that has pooled against the reservoir closed end 142 is drawn through the coarse filter 18 into the fuel pump 60 via the fuel pump inlet 70. In particular, since the coarse filter 18 is a wicking filter and is disposed in the reservoir 140, fuel is wicked from the filter inner portion 20 to the filter protruding portion 22, where it is supplied to the fuel inlet 70 of the fuel pump 60. The path of the wicked fuel is represented in FIG. 13 by dotted arrows. Thus, fuel that is pooled within the reservoir 140 while the vehicle is in the abnormal operating orientation is available for use by the pump 60, whereby an engine stall can be delayed or prevented.

In the illustrated embodiment, the fuel pump 60 is a turbine fuel pump with an electric motor. However, the fuel pump 60 is not limited to this type of fuel pump, and any appropriate type of fuel pump can be used.

Selective illustrative embodiments of the vehicle fuel tank assembly and fuel module are described above in some detail. It should be understood that only structures considered necessary for clarifying the vehicle fuel tank assembly and fuel module have been described herein. Other conventional structures, and those of ancillary and auxiliary components of the vehicle fuel tank assembly and fuel module, are assumed to be known and understood by those skilled in the art. Moreover, while working examples of the vehicle fuel tank assembly and fuel module have been described above, the vehicle fuel tank assembly and fuel module are not limited to the working examples described above, but various design alterations may be carried out without departing from the vehicle fuel tank assembly and fuel module as set forth in the claims.

We claim:

1. A fuel pump module for supporting a fuel pump within a fuel tank of a vehicle, the fuel pump module comprising a module housing and the fuel pump, wherein
   the module housing includes a pump holder that includes:
   a pump holder first end;
   a pump holder second end that is opposed to the pump holder first end;
   an inner wall that extends between the pump holder first end and the pump holder second end, an inner surface of the inner wall defining a pump cavity;
   an outer wall that surrounds a portion of the inner wall; and
   a reservoir that is disposed between a first portion of the outer wall and the inner wall, the reservoir including
   a closed end that is disposed between the pump holder first end and the pump holder second end, and
   an open end that is disposed between the closed end and the pump holder first end, and
   the fuel pump includes:
   a pump first end that includes a fuel inlet;
   a pump second end that includes a fuel outlet and is opposed to the pump first end; and a longitudinal axis that extends through the pump first end and the pump second end, wherein the fuel pump is disposed in the pump cavity with the pump first end received in the pump holder first end and the pump second end received in the pump holder second end.

2. The fuel pump module of claim 1, wherein the pump holder comprises a fuel return passageway that provides a fuel return path between the pump holder second end and the pump holder first end, wherein the fuel return passageway is disposed between a second portion of the outer wall and the inner wall, and wherein the fuel return passageway is configured to return excess fuel provided at the fuel outlet to the fuel inlet.

3. The fuel pump module of claim 1, wherein the outer wall is spaced apart from the inner wall in a direction transverse to the longitudinal axis, the closed end of the reservoir extends between the outer wall portion and the inner wall, the reservoir includes a port that is in fluid communication with the fuel return passageway, and the port is disposed in the closed end.

4. The fuel pump module of claim 1, wherein the outer wall is spaced apart from the inner wall in a direction transverse to the longitudinal axis, and the first portion of the outer wall extends circumferentially about the inner wall a distance corresponding to an arc of at least 120 degrees.

5. The fuel pump module of claim 1, wherein the closed end extends between the outer wall portion and the inner wall, the closed end intersecting the inner wall along a line that extends about a circumference of the inner wall, the reservoir includes lateral sides that extend between the outer wall portion and the inner wall, each of the lateral sides intersecting the inner wall along a line that extends in parallel to the longitudinal axis.

6. The fuel pump module of claim 1, wherein the closed end extends between the outer wall portion and the inner wall, and resides in a plane that is transverse to the longitudinal axis.

7. The fuel pump module of claim 1, comprising a filter disposed in the reservoir.

8. The fuel pump module of claim 7, wherein the filter is a wicking filter.

9. The fuel pump of claim 7, wherein a protruding portion of the filter protrudes out of the reservoir and is angled toward the longitudinal axis of the fuel pump.

10. The fuel pump module of claim 1, comprising a wicking filter disposed in the reservoir, wherein a portion of the filter protrudes out of the reservoir and overlies the fuel pump inlet, and fuel disposed in the reservoir is supplied to the fuel pump inlet via the wicking filter.

11. The fuel pump module of claim 1, wherein the module housing includes a module locator that is disposed on the pump holder first end, the module locator including a sleeve portion, and a footed portion that is disposed on one end of the sleeve portion and includes at least one protruding foot, wherein a portion of the pump holder inner wall is disposed in the sleeve portion, a portion of the sleeve portion is disposed in the reservoir, and the footed portion protrudes out of the pump holder.

12. The fuel pump module of claim 11, comprising a filter disposed in the reservoir between the pump holder outer wall and the sleeve portion of the module locator.

13. The fuel pump module of claim 1, wherein the vehicle is a saddle-type vehicle.

14. A fuel tank assembly for a vehicle, the fuel tank assembly comprising:

a fuel tank; and a fuel pump module disposed in the fuel tank, the fuel pump module configured to support a fuel pump within the fuel tank, the fuel pump module comprising a module housing and the fuel pump, wherein the module housing includes a pump holder that includes:
a pump holder first end;
a pump holder second end that is opposed to the pump holder first end;
an inner wall that extends between the pump holder first end and the pump holder second end, an inner surface of the inner wall defining a pump cavity;
an outer wall that surrounds a portion of the inner wall; and
a reservoir that is disposed between a first portion of the outer wall and the inner wall, the reservoir including
a closed end that is disposed between the pump holder first end and the pump holder second end, and
an open end that is disposed between the closed end and the pump holder first end, and the fuel pump includes:
a pump first end that includes a fuel inlet;
a pump second end that includes a fuel outlet and is opposed to the pump first end; and
a longitudinal axis that extends through the pump first end and the pump second end, wherein
the fuel pump is disposed in the pump cavity with the pump first end received in the pump holder first end and the pump second end received in the pump holder second end.

15. The fuel tank assembly of claim 14, wherein the pump holder comprises a fuel return passageway that provides a fuel return path between the pump holder second end and the pump holder first end, wherein the fuel return passageway is disposed between a second portion of the outer wall and the inner wall, and wherein the fuel return passageway is configured to return excess fuel provided at the fuel outlet to the fuel inlet.

16. The fuel tank assembly of claim 14, wherein the outer wall is spaced apart from the inner wall in a direction transverse to the longitudinal axis, the closed end of the reservoir extends between the outer wall portion and the inner wall, the reservoir includes a port that is in fluid communication with the fuel return passageway, and the port is disposed in the closed end.

17. The fuel tank assembly of claim 14, wherein the outer wall is spaced apart from the inner wall in a direction transverse to the longitudinal axis, and the first portion of the outer wall extends circumferentially about the inner wall a distance corresponding to an arc of at least 120 degrees.

18. The fuel tank assembly of claim 14, comprising a filter disposed in the reservoir.

19. The fuel tank assembly of claim 18, wherein a protruding portion of the filter protrudes out of the reservoir and is angled toward the longitudinal axis of the fuel pump.

20. The fuel tank assembly of claim 14, comprising a wicking filter disposed in the reservoir, wherein a portion of the filter protrudes out of the reservoir and overlies the fuel pump inlet, and fuel disposed in the reservoir is supplied to the fuel pump inlet via the wicking filter.

21. The fuel tank assembly of claim 14, wherein
when the fuel module is in a first operating orientation, fuel disposed in the reservoir flows out of the reservoir open end under force of gravity, and
when the fuel pump is in second operating orientation, fuel disposed in the reservoir pools against the reservoir closed end.

22. The fuel tank assembly of claim 21, wherein
the fuel pump module includes a wicking filter disposed in the reservoir, and a portion of the filter protrudes out of the reservoir and overlies the fuel pump inlet, and fuel disposed in the reservoir is supplied to the fuel pump inlet via the wicking filter.

23. A fuel pump module for supporting a fuel pump within a fuel tank of a saddle-type vehicle, the fuel pump module comprising:
a module housing configured to be disposed in the fuel tank of the saddle-type vehicle;
the fuel pump disposed in the module housing, the fuel pump comprising a fuel inlet at a first end of the fuel pump, and a fuel outlet at a second end of the fuel pump; and
a fuel pressure regulator supported by the module housing and disposed at the fuel outlet, the fuel pressure regulator configured to control a fuel pressure of fuel discharged from the fuel pump and direct at least a portion of the fuel discharged from the fuel pump to an engine of the vehicle,
wherein
the module housing is configured to direct excess fuel discharged from the fuel pump to a reservoir provided in the module housing,
the fuel pump module is operable in a first orientation in space iii which the pump second end is above the fuel pump first end,
the fuel pump module is operable in a second orientation in space in which the pump second end is below the fuel pump first end, and
the reservoir is configured so that
when the module housing is in the first orientation in space, the excess fuel drains from the reservoir under force of gravity, and
when the module housing is in second orientation in space, the excess fuel is retained within the reservoir.

* * * * *

UNITED STATES PATENT AND TRADEMARK OFFICE
CERTIFICATE OF CORRECTION

PATENT NO. : 10,882,395 B2
APPLICATION NO. : 16/146183
DATED : January 5, 2021
INVENTOR(S) : Mason et al.

It is certified that error appears in the above-identified patent and that said Letters Patent is hereby corrected as shown below:

In the Claims

In Claim 23, at Column 12, Line 12: "space iii which" should read --space in which--.

In Claim 23, at Column 12, Line 22: "in second orientation" should read --in the second orientation--.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*